US008458309B2

(12) United States Patent
Garcia-Martin et al.

(10) Patent No.: US 8,458,309 B2
(45) Date of Patent: Jun. 4, 2013

(54) ORTHOGONAL SUBSCRIPTION

(75) Inventors: Miguel Angel Garcia-Martin, Helsinki (FI); Marcin Matuszewski, Espoo (FI)

(73) Assignee: Nokia Corporation, Espoo (FI)

( * ) Notice: Subject to any disclaimer, the term of this patent is extended or adjusted under 35 U.S.C. 154(b) by 676 days.

(21) Appl. No.: 11/607,378

(22) Filed: Dec. 1, 2006

(65) Prior Publication Data

US 2008/0133644 A1 Jun. 5, 2008

(51) Int. Cl.
*G06F 15/173* (2006.01)

(52) U.S. Cl.
USPC ............ 709/223; 709/224; 709/220; 709/203

(58) Field of Classification Search
USPC .................................................. 709/223–226
See application file for complete search history.

(56) References Cited

U.S. PATENT DOCUMENTS

| | | | | |
|---|---|---|---|---|
| 2002/0143876 | A1 * | 10/2002 | Boyer et al. | 709/205 |
| 2004/0122896 | A1 * | 6/2004 | Gourraud | 709/204 |
| 2004/0128344 | A1 * | 7/2004 | Trossen | 709/203 |
| 2004/0162851 | A1 | 8/2004 | Nguyen | 707/104.1 |
| 2005/0289097 | A1 | 12/2005 | Trossen et al. | 707/1 |
| 2007/0266089 | A1 * | 11/2007 | Atarius et al. | 709/204 |

FOREIGN PATENT DOCUMENTS

| | | | |
|---|---|---|---|
| EP | 1 071 295 | A2 | 1/2001 |
| WO | WO 01/54421 | A2 | 7/2001 |
| WO | WO 2006/113217 | A1 | 10/2006 |
| WO | WO 2006/121550 | A2 | 11/2006 |

OTHER PUBLICATIONS

Wahl et al., Lightweight Directory Access Protocol (v3), Dec. 1997, http://www.isi.edu/in-notes/rfc2251.txt.*

Ding et al., "Ontology Library Systems: the key to successful Ontology Re-use", Aug. 2001, pp. 93-112. http://academic.research.microsoft.com/Paper/118726.*

Olaf Bergmann, NPL document "A Framework for Aggregation of Presence Information Based on User-Provisioned Rules" Nov. 2006 pp. 9, 21, 22, 28, 41-42, 50-51, 70-73, 78-79, 88, 217-218.*

Wikipedia, http://en.wikipedia.org/wiki/Server_(computing), available on Feb. 25, 2006.*

Wikipedia, http://en.wikipedia.org/wiki/Uniform_Resource_Name, available on Apr. 15, 2005.*

R. Moats, RFC 2141, URN Syntax, Network Working Group, Category: Standards Track, May 1997, pp. 1-8.

Rosenberg et al., RFC 3261, SIP: Session Initiation Protocol, Network Working Group, Category: Standards Track, Copyright The Internet Society, Jun. 2002, pp. 1-269.

A. B. Roach, RFC 3265, Session Initiation Protocol (SIP)-Specific Event Notification, Network Working Group, Category: Standards Track, Copyright The Internet Society, Jun. 2002, pp. 1-38.

(Continued)

*Primary Examiner* — Ian N Moore
*Assistant Examiner* — Jackie Zuniga
(74) *Attorney, Agent, or Firm* — Harrington & Smith

(57) ABSTRACT

A method for managing event-based information. The method includes receiving event-based information originating from a plurality of information suppliers, and linking same type of event-based information originating from different information suppliers together by allocating a common uniform resource identifier to information modules of similar type.

24 Claims, 11 Drawing Sheets

OTHER PUBLICATIONS

Berners-Lee, et al., RFC 3986, Uniform Resource Identifier (URI): Generic Syntax, Network Working Group, Category: Standards Track, Copyright The Internet Society, Jan. 2005, pp. 1-61.
Schulzrinne et al., RFC 4480, RPID: Rich Presence Extensions to the Presence Information Data Format (PIDF), Network Working Group, Category: Standards Track, Copyright The Internet Society, Jul. 2006, pp. 1-37.
Khartabil et al., RFC 4660, Functional Description of Event Notification Filtering, Network Working Group, Category: Standards Track, Copyright The Internet Society, Sep. 2006, pp. 1-31.

* cited by examiner

ORTHOGONAL SUBSCRIPTION

FIELD OF THE INVENTION

The present invention relates to subscriptions in communication systems. More particularly, but not exclusively, the invention relates to session initiation protocol based subscriptions.

BACKGROUND OF THE INVENTION

The infrastructure of Session Initiation Protocol (SIP) is defined in *IETF RFC* 3261 (Rosenberg et al., June 2002). In general, SIP is an application-layer control (signaling) protocol for creating, modifying and terminating sessions with one or more participants. The sessions can include, among other things, Internet telephone calls, multimedia distribution and multimedia conferences. SIP invitations are used to create sessions carrying session descriptions that allow participants to agree on a set of compatible media types. SIP makes use of elements called proxy servers to help route requests to the user's current location, authenticate and authorize users for services, implement provider call-routing policies and provide features to users. SIP also provides a registration function that allows users to upload their current locations for use by proxy servers. SIP runs on top of several different transport protocols.

In *IETF RFC* 3265 (A. Roach, July 2002), there is described a SIP event framework to enable event-based information provisioning to any node in the Internet. Examples of this kind of information are presence, location information, content/service availability, or access-controlled SIP events.

As is discussed in *RFC* 3265, the general concept is that entities in the network can subscribe to resource or call state for various resources or calls in the network, and those entities (or entities acting on their behalf) can send notifications when those states change. A typical flow of messages would be:

| Subscriber | Notifier | |
|---|---|---|
| \|-----SUBSCRIBE------>\| | | Request state subscription |
| \|<------- 200----------- \| | | Acknowledge |
| \|<-----NOTIFY--------- \| | | Return current subscription state |
| \|--------- 200--------->\| | | Acknowledge |
| \|<-----NOTIFY--------- \| | | Return current state information |
| \|---------200--------->\| | | Acknowledge |

An event package is an additional specification which defines a set of state information to be reported by a notifier to a subscriber. Event packages also define further syntax and semantics based on the framework defined by *RFC* 3265 that are required to convey such state information.

The SIP event framework as presented in *RFC* 3265 is a technique to provide context information in general. For example, SIP presence service provides a particular piece of context information, using a particular SIP event package. The SIP presence information may carry availability information about the user (e.g., the user is online or offline, busy, speaking on the phone), activities he is doing, future events learnt through a calendar application, location information supplied by, e.g., a Global Positioning System (GPS) devices, etc.

Some known subscription solutions for SIP events, such as for SIP presence, watcherinfo, and even call-state information, only allow watchers to subscribe to event state information that is associated with a particular resource, where the particular resource is addressed as a SIP URI (Uniform Resource Identifier). For example, a subscription to a presence event is bound to a so-called presentity, representing the user to which the presence information is associated. Hence, when subscribing to event state information, the subscribers subscribe to event state information of a particular, a priori known resource (addressed through the SIP URI). In other words, the watcher always needs to specify the SIP URI of the presentity (or the interested person) in his subscription message.

According to these known solutions, it is not possible to subscribe to event state information that is derivable from a set of state information associated to different URIs. For example, these known solutions do not enable easily discovering all the friends of the watcher which are currently located nearby.

Lately, one solution to this problem has been presented in a published US patent application number U.S. 2005/0289097 by Dirk Trossen and Dana Pavel, assigned to Nokia Corporation. This solution defines a new event package which is used to implement a complex query in a single subscription dialog. With the aid of this solution, it is possible to enable queries for SIP event state data such as:

"Which persons (resources) are in a meeting, the meeting being in a particular location?", and "Which persons (resources) are at work right now, with work location Boston, and are not busy?"

One problem with the solution presented in U.S. 2005/0289097, though, is that it needs the definition of a new event package.

SUMMARY

It is an object of this invention to provide a method that allows the discovery of one or more URIs that share a common characteristic.

According to a first aspect of the invention there is provided a method for managing event-based information, comprising:

receiving event-based information originating from a plurality of information suppliers; and linking same type of event-based information originating from different information suppliers together by a uniform resource identifier.

In an embodiment, the total event state information related to a user is split into different modules (or types of information), each module containing independent data, for example, presence availability, location information, SIP capabilities, calendar supplied information, etc. In an embodiment, each of these modules is assigned a uniform resource identifier (URI), such as a uniform resource name (URN) that describes and identifies the module. Accordingly, in an embodiment, event-based information originating from different information suppliers is linked together by allocating a common uniform resource identifier to event state information modules of similar type. In an embodiment, subscriptions of event-based information are addressed towards a module, rather than towards a specific user. Subscribers may subscribe to a module/modules of their interest.

In an embodiment, publication requests carrying event state information and sent from an information supplier may comprise the URI (or URN) of each module (if the information supplier implements this capability). In an embodiment, if an event server, such as a SIP event state information aggregation and composition server, receives a publish request with module(s) without a URI, the event server may add the URI to the module. A list of event state information types and corresponding URIs may have been generated beforehand.

An embodiment of the invention allows a watcher to find those suppliers of SIP event state information that have published certain SIP event state information modules.

According to a second aspect of the invention there is provided an event server, comprising:

a receiver for receiving event-based information originating from a plurality of information suppliers; and a processor for linking same type of event-based information originating from different information suppliers together by a uniform resource identifier.

According to a third aspect of the invention there is provided a method for managing event-based information, comprising:

generating event-based information at an information supplier in modules so that different type of event-based information of the same information supplier is represented by different modules;

identifying different modules of the same information supplier by different uniform resource identifiers.

According to a fourth aspect of the invention there is provided an apparatus, comprising:

a processor for generating event-based information at an information supplier in modules so that different type of event-based information of the same information supplier is represented by different modules, wherein the apparatus is configured to identify different modules of the same information supplier by different uniform resource identifiers.

According to a fifth aspect of the invention there is provided a method for obtaining event-based information, comprising:

generating an event-based information subscription request addressed to a uniform resource identifier which links together same type of event-based information originating from different information suppliers; and transmitting the subscription request to an event server.

According to a sixth aspect of the invention there is provided an apparatus, comprising:

a processor for generating an event-based information subscription request addressed to a uniform resource identifier which links together same type of event-based information originating from different information suppliers; and a transmitter for transmitting the subscription request to an event server.

The apparatuses in accordance with the fourth and sixth aspect may be wireless or non-wireless apparatuses. In an embodiment, these apparatuses are selected from a group comprising: mobile phones, SIP compliant mobile terminals, portable handheld multimedia apparatuses configured for wireless communication, fixed computers, laptop computers, fixed SIP phones, soft phones, and any other kind of applicable wireless or non-wireless devices.

According to a seventh aspect of the invention there is provided a computer program stored in a computer readable medium, the computer program comprising computer executable program code (or software) adapted to cause an apparatus to perform the method of the first aspect.

According to an eighth aspect of the invention there is provided a computer program stored in a computer readable medium, the computer program comprising computer executable program code (or software) adapted to cause an apparatus to perform the method of the third aspect.

According to a ninth aspect of the invention there is provided a computer program stored in a computer readable medium, the computer program comprising computer executable program code (or software) adapted to cause an apparatus to perform the method of the fifth aspect.

Various embodiments of the present invention are illustrated only with reference to certain aspects of the invention. It should be appreciated that corresponding embodiments may apply to other aspects as well.

BRIEF DESCRIPTION OF THE DRAWINGS

The invention will be described, by way of example only, with reference to the accompanying drawings, in which.

DETAILED SPECIFICATION

Figure 1:
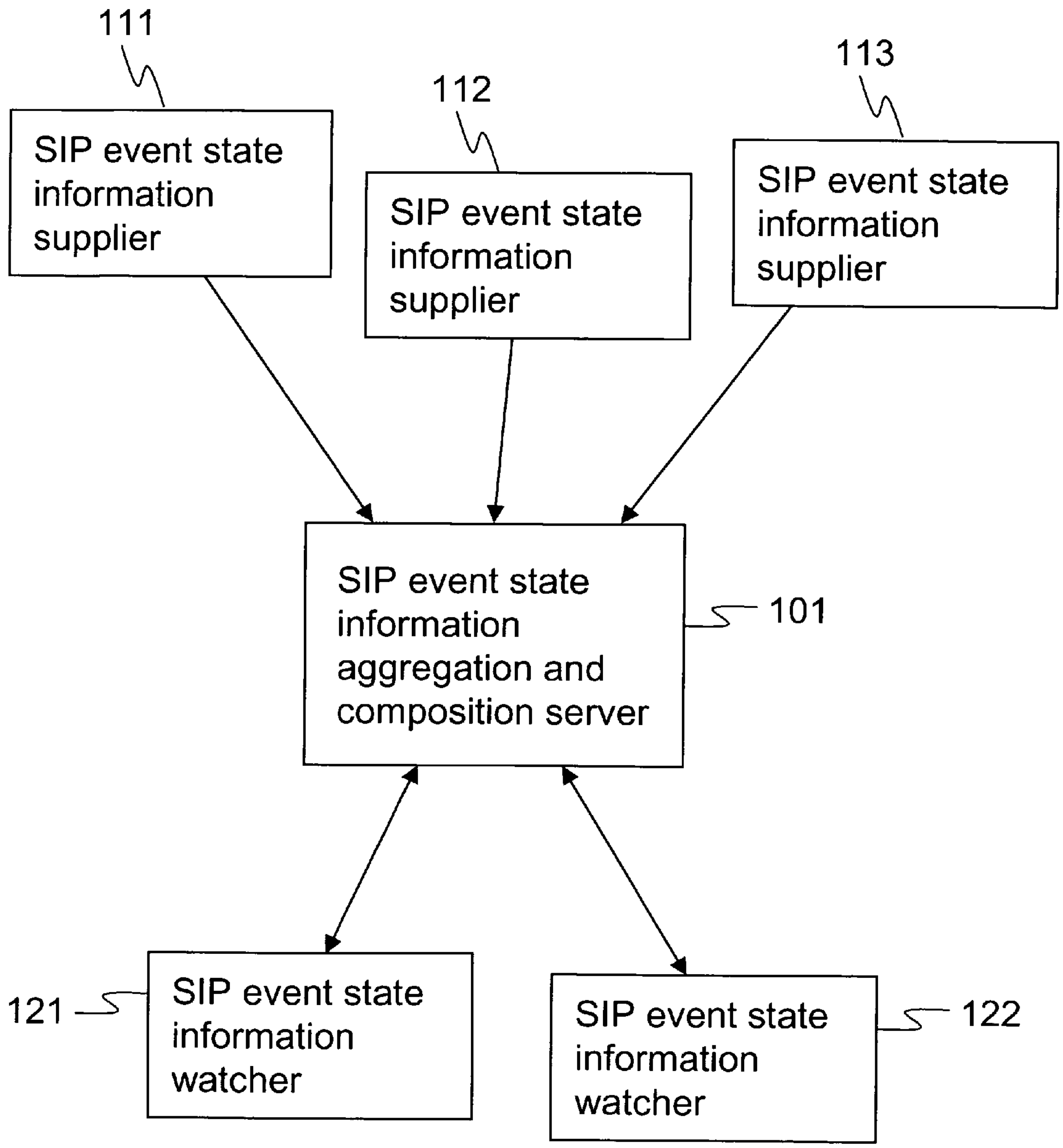
FIG. 1 shows a SIP event state subscription and notification architecture.

In the following description, presence service is shown as an example. However, it should be noted that the following description is generally applicable to any other SIP event-based subscription that is done in compliance with *RFC* 3265, such as for example a SIP file sharing network. Furthermore, some embodiments of the invention are also applicable to managing event-based information in some other environment than SIP environment.

It is known that a watcher can subscribe to event state information at an event server, for example a SIP event state information aggregation and composition server. The event server then supplies to the watcher the current event state information and its updates. In case of the presence service, the event server is typically named a presence server and the supplied event state information is named presence information. The supplied presence information comprises a variety of information in different types of information, for example: online/offline status, activity status (on the phone, in a meeting), mood (sad, angry, etc.), type of location (classroom, home, library), time offset, feature planned activities (meetings according to the calendar), geographical location information (coordinates from a GPS receiver, or civic address), etc.

Let us now assume a scenario for presence service where a watcher is interested in discovering those users who are doing a particular activity, or those who are in a good mood, or attending a meeting, or within a certain ration of a location.

Examples of some case scenarios that can be addressed are as follows:

A) Jari wants to meet one or more friends who are located within 1000 meters of his current location. He first learns who of his friends are closely located and then invites them to a beer in a bar nearby.

B) In a SIP file sharing system, Kai wants to know which users store a given file, so that Kai can then download that file from one of those users.

C) Reijo wants to book a table for four people in a restaurant located in a certain district in his hometown. He wants to learn which restaurants are available in that district and how many tables are available.

For the purposes of the examples presented above and other examples, an embodiment of the invention suggests that event state information (such as presence information) is composed of separate modules. The presence information introduced in the preceding, that is, online/offline status, activity status, mood, type of location, time offset, feature planned activities, geographical location information, etc. each forms a separate module. Each module represents a particular aspect of the supplied event state information. In an embodiment, a Uniform Resource Identifier (URI) is assigned to each of those independent modules (types of information). Presentities or other sources of SIP event state information publish (or supply with a PUBLISH request) their information as usually, but advantageously including a URI in each module that composes their state information. If the source of SIP event state information does not include a URI in each of the modules, the SIP event state information composition and aggregation server (e.g., the presence server) may add it automatically on the reception of the publication.

In a particular case of presence subscriptions, when a watcher (or user) wants to find out which other users have published a certain module, the watcher sends a SIP subscription to the presence server. This can be a SIP SUBSCRIBE request which, rather than being addressed to a source of event state information (such as a presentity), is addressed to the URI of the module in which the watcher is interested. In other words, the watcher subscribes to orthogonal event state information. The information to which the watcher subscribes is orthogonal because the subscription does not provide the presentity's URI as an input, but as an output. The subscription provides a common characteristic of the presence information across different presentities, and the presentity's URI is received (or presentities' URIs are received) as an output.

When the event server (e.g., the presence server), in response to receiving the subscription, sends a NOTIFY request to the watcher, the NOTIFY request includes a document that can list either:

i) All the URIs of the users (sources of event information such as presentities) that published event state information about the requested module (this is a list of references); or ii) The same list as in the previous case, but for each listed source of event state information, the server also adds the whole current available presence information (the exact contents are subject to potential requested filtering).

The filtering mentioned in case ii above refers to the fact that the conventional solutions already define the possibility to filter information which the watcher is not interested in receiving. The watcher can indicate the type of information he/she is not interested in receiving by including a filter which, for example, removes the activity status or only includes in the reply certain, specified information. For example, the subscription can relate to the availability status information of users in a given geographical location.

According to an advantageous embodiment, all modules containing information of a same type, e.g., location information, will share the same URI.

Embodiments of the invention, concerning presence service in particular, are next described in further detail. First, embodiments relating to the publication of SIP event state are described.

In an embodiment, a supplier of modular SIP event state information composes an event state information document as usually. Then it examines the different modules that are comprised in the document, and allocates a URI to each of these modules. This newly allocated URI can be a location and protocol independent identifier. It can be a URN (Uniform Resource Name).

The following shows an example of the event state information document. The document is formulated in PIDF (presence information data format) extended by RPID (rich presence information data format). The document contains the presence information of a presentity. The presentity (Larry) is indicating that he is 'online' (open status), in a bar located in Broadway in New York, he is having a vacation, and that he is happy and flirtatious in a noisy bar. The document contains a URI attribute for each of the modular elements (as highlighted in bold font style). The URI attribute contains a URN that identifies the module itself as follows:

```
<?xml version="1.0" encoding="UTF-8"?>
  <presence xmlns="urn:ietf:params:xml:ns:pidf"
    xmlns:dm="urn:ietf:params:xml:ns:pidf:data-model"
    xmlns:lt="urn:ietf:params:xml:ns:location-type"
    xmlns:rpid="urn:ietf:params:xml:ns:pidf:rpid"
    xmlns:gp="urn:ietf:params:xml:ns:pidf:geopriv10"
    xmlns:cl=" urn:ietf:params:xml:ns:pidf:geopriv10:civicLoc"
    xmlns:id="urn:nokia:params:xml:ns:pidf:id"
    entity="sip:larry@example.com">
 <tuple id="bs35r9">
   <status id:uri="urn:nokia:params:xml:ns:pidf:status">
     <basic>open</basic>
     <gp:geopriv>
       <gp:location-info id:uri="urn:nokia:params:xml:ns:pidf:location-
       info">
         <cl:civicAddress>
           <cl:country>US</cl:country>
           <cl:A1>New York</cl:A1>
           <cl:A3>New York</cl:A3>
           <cl:A6>Broadway</cl:A6>
           <cl:HNO>123</cl:HNO>
           <cl:NAM>The Oasis Bar, Grill and Sauna</cl:NAM>
           <cl:PC>10027-0401</cl:PC>
         </cl:civicAddress>
       </gp:location-info>
     </gp:geopriv>
     </status>
     <contact priority="0.8">im:someone@mobile.example.net</
     contact>
 </tuple>
 <dm:person id="p1">
   <rpid:activities id:uri="urn:nokia:params:xml:ns:pidf:activities">
       <rpid:vacation/>
   </rpid:activities>
   <rpid:mood id:uri="urn:nokia:params:xml:ns:pidf:mood">
     <rpid:happy/>
     <rpid:flirtatious/>
   </rpid:mood>
   <rpid:place-is id:uri="urn:nokia:params:xml:ns:pidf:place-is">
       <rpid:audio>
         <rpid:noisy/>
       </rpid:audio>
   </rpid:place-is>
   <rpid:place-type id:uri="urn:nokia:params:xml:ns:pidf:place-type">
       <lt:bar/>
   </rpid:place-type>
 </dm:person>
</presence>
```

The supplier sends a PUBLISH request comprising this kind of SIP event state information document to the event server, e.g., the presence server. The server acknowledges its reception by sending an acknowledgement to the supplier, and checks if the modules are marked with a URI. In case they are not, it adds a URI that describes the module. Then the server stores the document for future use.

Each information supplier does the same: it identifies the modules that compose its SIP event state information, allocates a URI to each of these modules, and publishes the document to the server.

Different suppliers do not need to publish exactly the same collection of modules. If a supplier does not support the mechanisms defined in this document, then it would just publish regular SIP event state information. An example of this would be the previous example without the bold-font strings.

In some other cases, the module may represent a file, in which case, the URN can effectively be a representation of the hash of the file, computed by a given hashing algorithm, such as the US Secure Hash Algorithm number 1 (SHA-1).

Secondly, embodiments relating to the aggregation and composition of SIP event state are described. To this end, it will only briefly be mentioned that upon request, the SIP event state information aggregation and composition server will determine those modules that share the same URI in different event state information documents. The server can then aggregate the information of their suppliers, and make it available to potential watchers.

Thirdly, embodiments relating to actual subscription to event-based information are described. In an embodiment, a watcher that wants to find out who are the suppliers of some particular module, sends a SUBSCRIBE request to the SIP event state information aggregation and composition server. The SUBSCRIBE request is addressed not to a supplier (URI of a presentity in the case of presence service) but to the URI of a module in which the watcher is interested. The SUBSCRIBE request is also not addressed merely to the presence service but to an orthogonal subscription relating to presence as can defined for example in an ‘Event’ header field as follows: Event: presence.orthogonal.

The following shows an example of the SUBSCRIBE request. In this example, a watcher wants to find out which presentities are publishing their location information module. The watcher builds a SIP SUBSCRIBE request whose Request-URI (illustrated by the bold font string on the first line of the request) is addressed to the URI that defines the main property (or module) that she seeks to obtain and sends the request to the SIP event state information aggregation and composition server.

```
SUBSCRIBE urn:nokia:params:xml:ns:pidf:location-info SIP/2.0
Via: SIP/2.0/UDP alice.example.net;branch=z9hG4bKnashds7
Max-Forwards: 70
From: <sip:alice@example.net>;tag=31415
To: <urn:nokia:params:xml:ns:pidf:location-info>
Route: <sip:server.example.com;lr>
Call-ID: b89rjhnedlrfjflslj40a222
```

-continued

```
CSeq: 61 SUBSCRIBE
Event: presence.orthogonal
Expires: 0
```

The event server accepts the subscription and sends a NOTIFY request to the watcher, the request comprising a document that lists the suppliers (URIs of the presentities in the case of presence service) which have published the defined module.

Additionally, the event server can add the information pertaining to the requested module for each listed supplier.

As to the SUBSCRIBE request presented in the preceding example, the server could send a NOTIFY request that could contain, for example, a list of suppliers of the requested module and the information pertaining to the requested module for each listed supplier as follows:

```
<?xml version=“1.0” encoding=“UTF-8”?>
  <resource-lists xmlns=“urn:ietf:params:xml:ns:pidf”
    xmlns:gp=“urn:ietf:params:xml:ns:pidf:geopriv10”
    xmlns:cl=“ urn:ietf:params:xml:ns:pidf:geopriv10:civicLoc”
    xmlns:id=“urn:nokia:params:xml:ns:pidf:id”
    entity=“urn:nokia:params:xml:ns:pidf:location-info”>
      <list>
        <entry uri=“sip:larry@example.com”>
          <gp:location-info
          id:uri=“urn:nokia:params:xml:ns:pidf:location-info”>
            <cl:civicAddress>
              <cl:country>US</cl:country>
              <cl:A1>New York</cl:A1>
              <cl:A3>New York</cl:A3>
              <cl:A6>Broadway</cl:A6>
              <cl:HNO>123</cl:HNO>
              <cl:NAM>The Oasis Bar, Grill and Sauna</cl:NAM>
              <cl:PC>10027-0401</cl:PC>
            </cl:civicAddress>
          </gp:location-info>
        </entry>
        <entry uri=“sip:bob@example.com”>
          <gp:location-info
          id:uri=“urn:nokia:params:xml:ns:pidf:location-info”>
            <cl:civicAddress>
              <cl:country>US</cl:country>
              <cl:A1>Washington</cl:A1>
              <cl:A6>President Avenue</cl:A6>
              <cl:HNO>123</cl:HNO>
              <cl:PC>90037-0456</cl:PC>
            </cl:civicAddress>
          </gp:location-info>
        </entry>
      </list>
    </resource-list>
```

In another embodiment, the event server not only includes the module information of each supplier, but also all the available event state information published by that supplier (subject to privacy and content filtering).

Following the preceding example, the event server (here: presence server) can include in the NOTIFY request a document that lists the two suppliers (in this example, Larry and Bob) of the requested module (location-info) together with all the published presence information pertaining to each of these suppliers as follows:

```
<?xml version=“1.0” encoding=“UTF-8”?>
  <resource-lists xmlns=“urn:ietf:params:xml:ns:pidf”
    xmlns:dm=“urn:ietf:params:xml:ns:pidf:data-model”
    xmlns:rpid=“urn:ietf:params:xml:ns:pidf:rpid”
    xmlns:gp=“urn:ietf:params:xml:ns:pidf:geopriv10”
```

-continued

```
xmlns:cl=" urn:ietf:params:xml:ns:pidf:geopriv10:civicLoc"
xmlns:id="urn:nokia:params:xml:ns:pidf:id"
entity="urn:nokia:params:xml:ns:pidf:location-info">
  <list>
    <entry uri="sip:larry@example.com">
      <presence>
        <tuple id="bs35r9">
          <status id:uri="urn:nokia:params:xml:ns:pidf:status">
            <basic>open</basic>
            <gp:geopriv>
              <gp:location-info
                id:uri="urn:nokia:params:xml:ns:pidf:location-info">
               <cl:civicAddress>
                 <cl:country>US</cl:country>
                 <cl:A1>New York</cl:A1>
                 <cl:A3>New York</cl:A3>
                 <cl:A6>Broadway</cl:A6>
                 <cl:HNO>123</cl:HNO>
                 <cl:NAM>The Oasis Bar, Grill and Sauna</cl:NAM>
                 <cl:PC>10027-0401</cl:PC>
               </cl:civicAddress>
              </gp:location-info>
            </gp:geopriv>
          </status>
          <contact priority="0.8">im:someone@mobile.example.net</contact>
         </tuple>
         <dm:person id="p1">
          <rpid:activities id:uri="urn:nokia:params:xml:ns:pidf:activities">
            <rpid:vacation/>
          </rpid:activities>
          <rpid:mood id:uri="urn:nokia:params:xml:ns:pidf:mood">
             <rpid:happy/>
             <rpid:flirtatious/>
          </rpid:mood>
          <rpid:place-is id:uri="urn:nokia:params:xml:ns:pidf:place-is">
            <rpid:audio>
              <rpid:noisy/>
            </rpid:audio>
          </rpid:place-is>
          <rpid:place-type id:uri="urn:nokia:params:xml:ns:pidf:place-type">
            <lt:bar/>
          </rpid:place-type>
        </dm:person>
      </presence>
    </entry>
    <entry uri="sip:bob@example.com">
      <presence>
       <tuple id="bs35r9">
        <status id:uri="urn:nokia:params:xml:ns:pidf:status>
          <basic>open</basic>
        </status>
       <gp:location-info
                     id:uri="urn:nokia:params:xml:ns:pidf:location-info">
         <cl:civicAddress>
            <cl:country>US</cl:country>
            <cl:A1>Washington</cl:A1>
            <cl:A6>President Avenue</cl:A6>
            <cl:HNO>123</cl:HNO>
            <cl:PC>90037-0456</cl:PC>
         </cl:civicAddress>
       </gp:location-info>
       <dm:deviceID>urn:device:0003ba4811e3</dm:deviceID>
       <rpid:relationship
                     id:uri="urn:nokia:params:xml:ns:pidf:relationship>
             <rpid:self/>
       </rpid:relationship>
       <rpid:service-class
                     id:uri="urn:nokia:params:xml:ns:pidf:service-class>
             <rpid:electronic/>
        </rpid:service-class>
        <contact priority="0.8">im:someone@mobile.example.net</contact>
        <note xml:lang="en">Don't Disturb Please!</note>
        <note xml:lang="fr">Ne derangez pas, s'il vous plait</note>
        <timestamp>2005-10-27T16:49:29Z</timestamp>
      </tuple>
      <tuple id="ty4658">
        <status id:uri="urn:nokia:params:xml:ns:pidf:status>
          <basic>open</basic>
        </status>
        <rpid:relationship
```

-continued

```
                        id:uri="urn:nokia:params:xml:ns:pidf:relationship>
                <rpid:assistant/>
            </rpid:relationship>
            <contact priority="1.0">mailto:secretary@example.com</contact>
        </tuple>
        <tuple id="eg92n8">
            <status id:uri="urn:nokia:params:xml:ns:pidf:status>
                <basic>open</basic>
            </status>
            <dm:deviceID>urn:x-mac:0003ba4811e3</dm:deviceID>
            <rpid:class id:uri="urn:nokia:params:xml:ns:pidf:class>
                email
            </rpid:class>
            <rpid:service-class
                        id:uri="urn:nokia:params:xml:ns:pidf:service-class>
                <rpid:electronic/>
            </rpid:service-class>
            <rpid:status-icon
                        id:uri="urn:nokia:params:xml:ns:pidf:status-icon>
                http://example.com/mail.png
            </rpid:status-icon>
            <contact priority="1.0">mailto:someone@example.com</contact>
        </tuple>
        <note>I'll be in Tokyo next week</note>
        <dm:device id="pc147">
            <rpid:user-input idle-threshold="600"
                    last-input="2004-10-21T13:20:00-05:00"
                    id:uri="urn:nokia:params:xml:ns:pidf:user-input
                idle
            </rpid:user-input>
            <dm:deviceID>urn:device:0003ba4811e3</dm:deviceID>
            <dm:note>PC</dm:note>
        </dm:device>
        <dm:person id="p1">
            <rpid:activities from="2005-05-30T12:00:00+05:00"
                    until="2005-05-30T17:00:00+05:00"
                    id:uri="urn:nokia:params:xml:ns:pidf:activities>
                <rpid:note>Far away</rpid:note>
                <rpid:away/>
            </rpid:activities>
            <rpid:class>
                    id:uri="urn:nokia:params:xml:ns:pidf:calendar>
                calendar
            </rpid:class>
            <rpid:mood id:uri="urn:nokia:params:xml:ns:pidf:mood>
                <rpid:angry/>
                <rpid:other>brooding</rpid:other>
            </rpid:mood>
            <rpid:place-is id:uri="urn:nokia:params:xml:ns:pidf:place-is>
                <rpid:audio>
                    <rpid:noisy/>
                </rpid:audio>
            </rpid:place-is>
            <rpid:place-type id:uri="urn:nokia:params:xml:ns:pidf:place-type>
                <lt:residence/>
            </rpid:place-type>
            <rpid:privacy>
                <rpid:unknown/>
            </rpid:privacy>
            <rpid:sphere id:uri="urn:nokia:params:xml:ns:pidf:sphere>
              bowling league
            </rpid:sphere>
            <rpid:status-icon
                        id:uri="urn:nokia:params:xml:ns:pidf:status-icon>
                http://example.com/play.gif
            </rpid:status-icon>
            <rpid:time-offset
                        id:uri="urn:nokia:params:xml:ns:pidf:time-offset>
                    -240
            </rpid:time-offset>
            <dm:note>Scoring 120</dm:note>
            <dm:timestamp>2005-05-30T16:09:44+05:00</dm:timestamp>
        </dm:person>
      </presence>
    </entry>
  </list>
</resource-list>
```

As can be understood from the above example, the amount of returned information can be large. In many cases, the watcher might just be interested in getting a few modules (for example, the status and location). Getting the right amount of desired information can be achieved by attaching a filter to the SUBSCRIBE request.

The use of filters is described for example in the specification *IETF RFC* 4660. By attaching a filter to the SUBSCRIBE request, the watcher can indicate to the server the pieces (elements) of the SIP event state information that he wants to receive. The server first selects the list of suppliers of the requested module and then applies the filter to eliminate undesired information. The SIP SUBSCRIBE request can still be addressed to the main module that determines which event state suppliers are inserted in the list.

In the preceding, a single server environment has been described. However, the presented embodiments apply as well to multi-server and/or multi-operator environments. A problem with these kinds of environments, though, is that each event server can only supply information about the suppliers which have published their information to that specific server. For example, in a multi-operator environment, the event server of Operator A will contain information supplied by users of Operator A, and will not contain information of users of Operator B, etc.

To mitigate the above-identified problem, in an embodiment, the event servers are configured in a peer-to-peer configuration supported by a Distributed Hash Table (DHT), for example. By configuring servers as peers in a DHT, a watcher needs to discover one of the servers, where it will be sending its subscription. The DHT system will route the request to the peer that is keeping track of where the information is available. In this way the watcher will eventually get in response event state information stored in different event servers.

In the following, it is discussed how a solution to the afore-mentioned case scenarios A-D can be found in accordance with some embodiments of the invention:

A) Jari wants to meet one or more friends who are located within 1000 meters of his current location. He first learns who of his friends are closely located and then invites them to a beer in a bar nearby.

One solution to case scenario A, in accordance with an embodiment, is as follows:

Jari sends a SUBSCRIBE request whose Request-URI is addressed to the URI (or URN) that identifies the geographical location coordinates module. Jari also supplies a filter that restricts the results to those within the limits of his current location. A SUBSCRIBE request is sent to a service provider, or a DHT node where all the service operators share information. He gets the list of URIs of the users which are located within the limits. Subsequently, he can send an INVITE request to them with a Subject header: "Want to have a beer around?"

B) In a SIP file sharing system, Kai wants to know which users store a given file, so that Kai can then download that file from one of those users.

One solution to case scenario B, in accordance with an embodiment, is as follows:

A file is identified by its hash. Kai sends a SIP SUBSCRIBE request whose Request-URI is addressed to the hash of the file. The SUBSCRIBE request is sent to any of the nodes that form the DHT system. This node forwards along the request to the node which is responsible for the address space that corresponds to the hash. This second node returns the list of URIs identifying users who have published such a file. Then Kai can establish a SIP file transfer operation with any (or all) of those users who own the file.

C) Reijo wants to book a table for four people in a restaurant located in a certain district in his hometown. He wants to learn which restaurants are available in that district and how many tables are available.

One solution to case scenario C, in accordance with an embodiment, is as follows:

Reijo creates a SUBSCRIBE request addressed to the geographical location, and includes a filter that selects the district he is currently in. He sends the SUBSCRIBE request to the book-a-table server, and gets a notification that includes the list of available restaurants (their SIP URIs), their availability (number of available tables), menus, prices, special offers, location, etc. After that, Reijo selects one of them and sends an INVITE request to speak to a sales representative to book the table.

FIG. 1 shows a SIP event state subscription and notification architecture. The SIP event state information aggregation and composition server 101 is the central node acting as a back-end server. It accepts publications of SIP event state information from suppliers 111, 112, 113. It also accepts subscriptions from watchers 121, 122, which want to be notified about certain SIP event state information. In the particular case of the presence service, suppliers are known as presentities, watchers are still known as watchers, and the server 101 is known as the presence server. The suppliers 111-113 and watchers 121, 122 can advantageously communicate with the server 101 wirelessly via SIP proxy servers (not shown).

Figure 2:
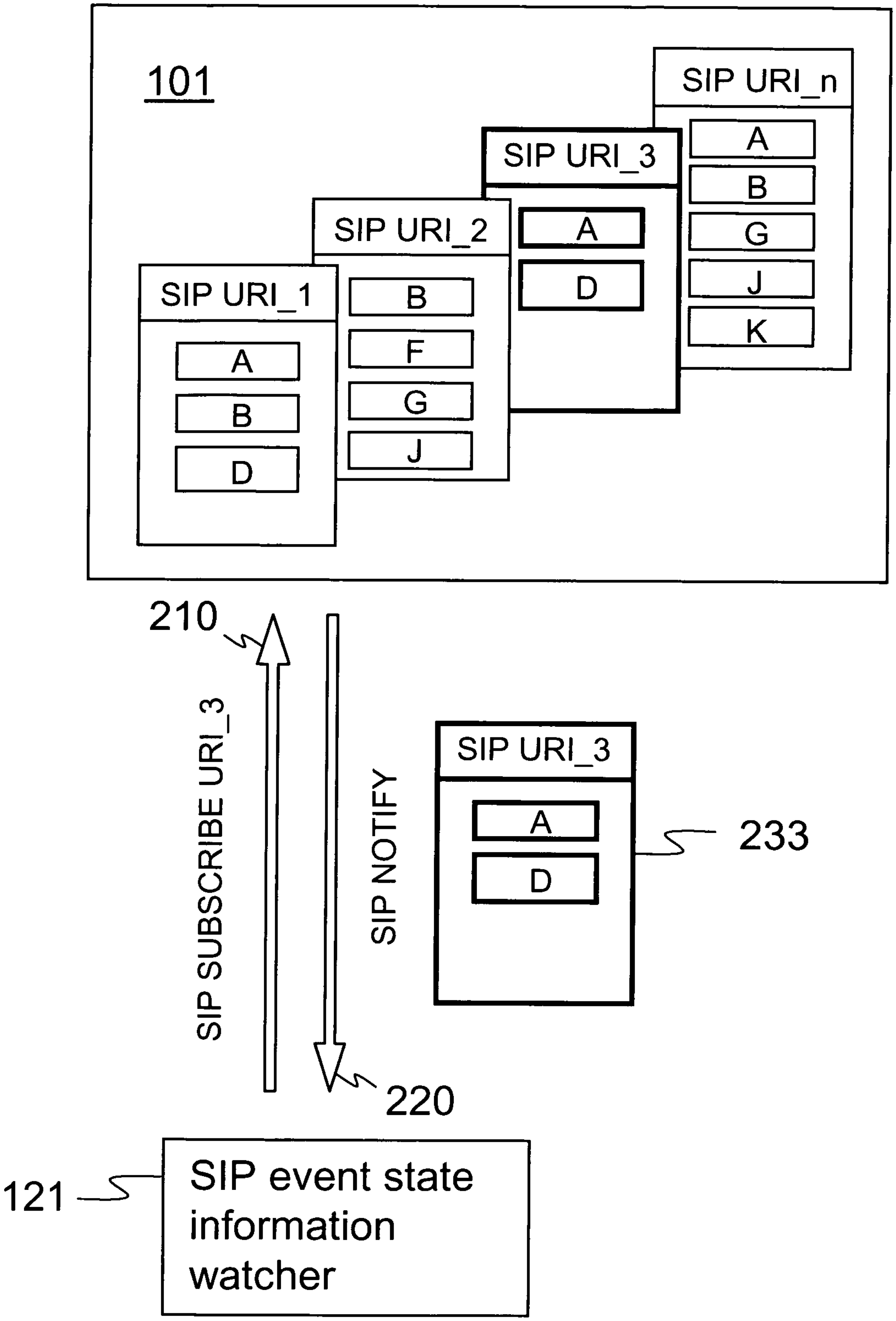
FIG. 2 shows event state subscription and notify operation in accordance with prior art.

FIG. 2 shows conventional event state subscription and notify operation. A watcher 121 sends a SIP SUBSCRIBE request 210 to the SIP event state information aggregation and composition server 101. The SUBSCRIBE request 210 is addressed (by its Request-URI field) to a URI (URI_3 in FIG. 2) that represents a SIP event state information supplier (not shown). The subscription is accepted by the server 101. As a result, the server 101 generates a NOTIFY request 220 that contains the event state 233 published by URI_3. This event state 233 contains information identifying the supplier (URI_3) and the actual event state information (pieces A and D).

Figure 3:
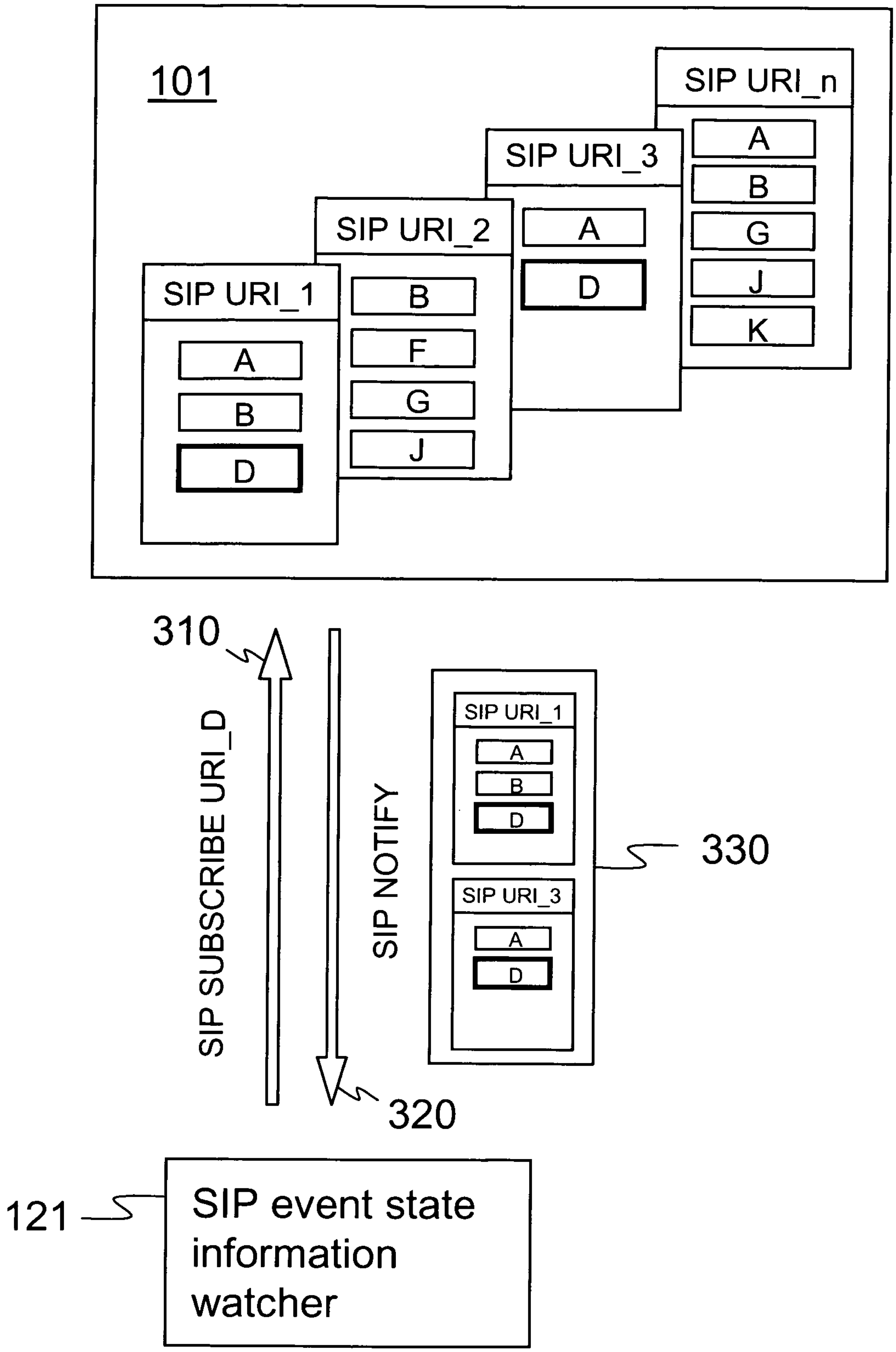
FIG. 3 shows event state subscription and notify operation in accordance with an embodiment of the invention.

FIG. 3 shows event state subscription and notify operation in accordance with an embodiment of the invention. A watcher 301 sends a SIP SUBSCRIBE request 310 to the SIP event state information aggregation and composition server 101. The SUBSCRIBE request 310 is addressed (by its Request-URI field) to a URI (URI_D in FIG. 3) that represents a module, not representing a supplier, but a certain aspect of the supplied event state information. The subscription is accepted by the server 101. As a result, the server 101 aggregates all the module information of the addressed module (Module D in FIG. 3) which has been published by different suppliers. Then the server generates a NOTIFY request 320 that contains a data structure or document 330 which, in turn, contains the list of suppliers (URI_1 and URI_3) that have published the addressed module. For each supplier, the list of all published modules is included in document 330 (subject to content filtering).

Figure 4:
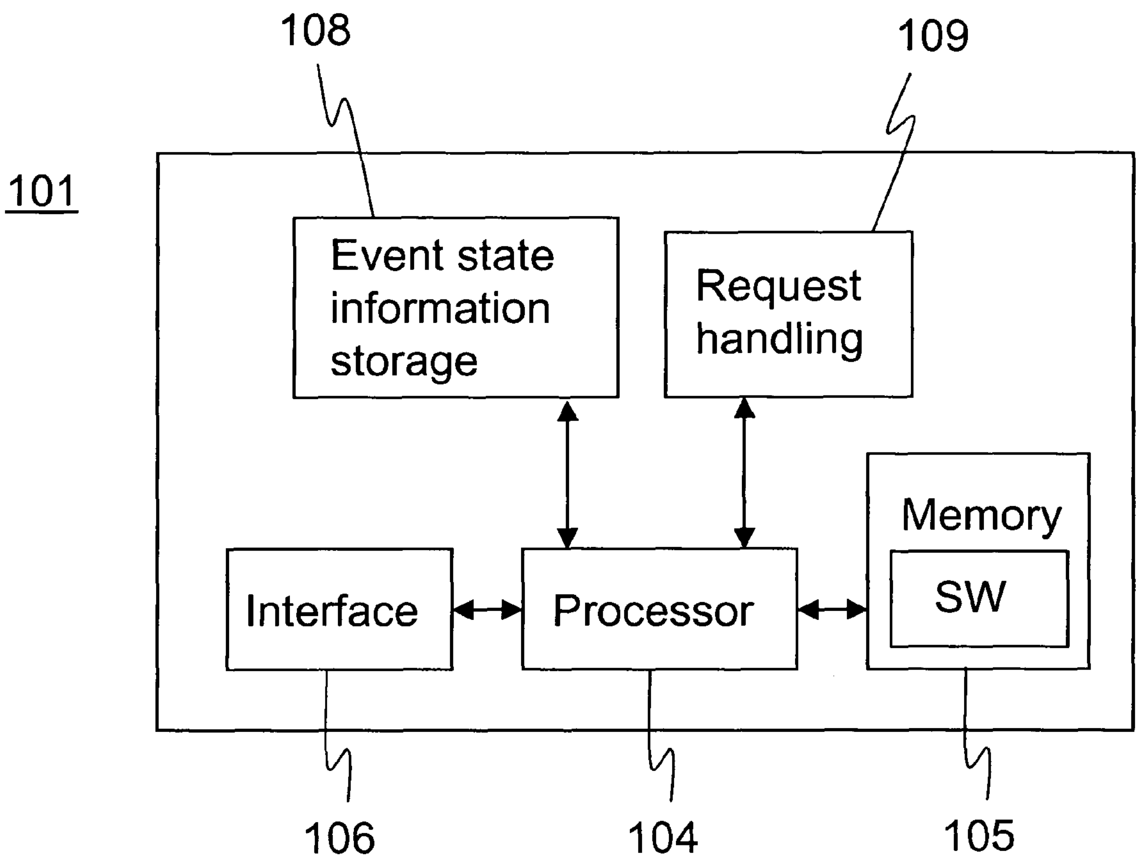
FIG. 4 shows a block diagram of an event server in accordance with an embodiment of the invention.

FIG. 4 shows a block diagram of an event server 101 in accordance with an embodiment of the invention. The event server 101 may be a SIP event state information aggregation and composition server. The event server 101 comprises a processor 104 for controlling the operation of the server 101, a memory 105 coupled to the processor 104 and computer program code or software, which is stored into memory 105. The software may include instructions for processor 104 to control the operation of the server 101.

The event server 101 further comprises a communication interface 106, an event state information storage 108 and a request handling function 109 (the function 109 may be implemented by software) coupled to the processor 104. The communication interface 106 comprises transmission and reception functions (these may be in the form of transmitters and receivers or transceivers) via which the server 101 receives requests from information suppliers 111-113 and information watchers 121-122. These requests are handled by the request handling function 109. The event state information received from information suppliers 111-113 is stored and maintained in the event state information storage 108. Subscribe requests received from information watchers 121-122 are also processed by the request handling function 109. As a response the request handling function 109 selects, based on the received URI, from the event state information storage 108 the desired information, filters the information if a filter has been set, and forwards the (filtered) information to the communication interface 106 for a subsequent transmission to the watcher.

Figure 5:
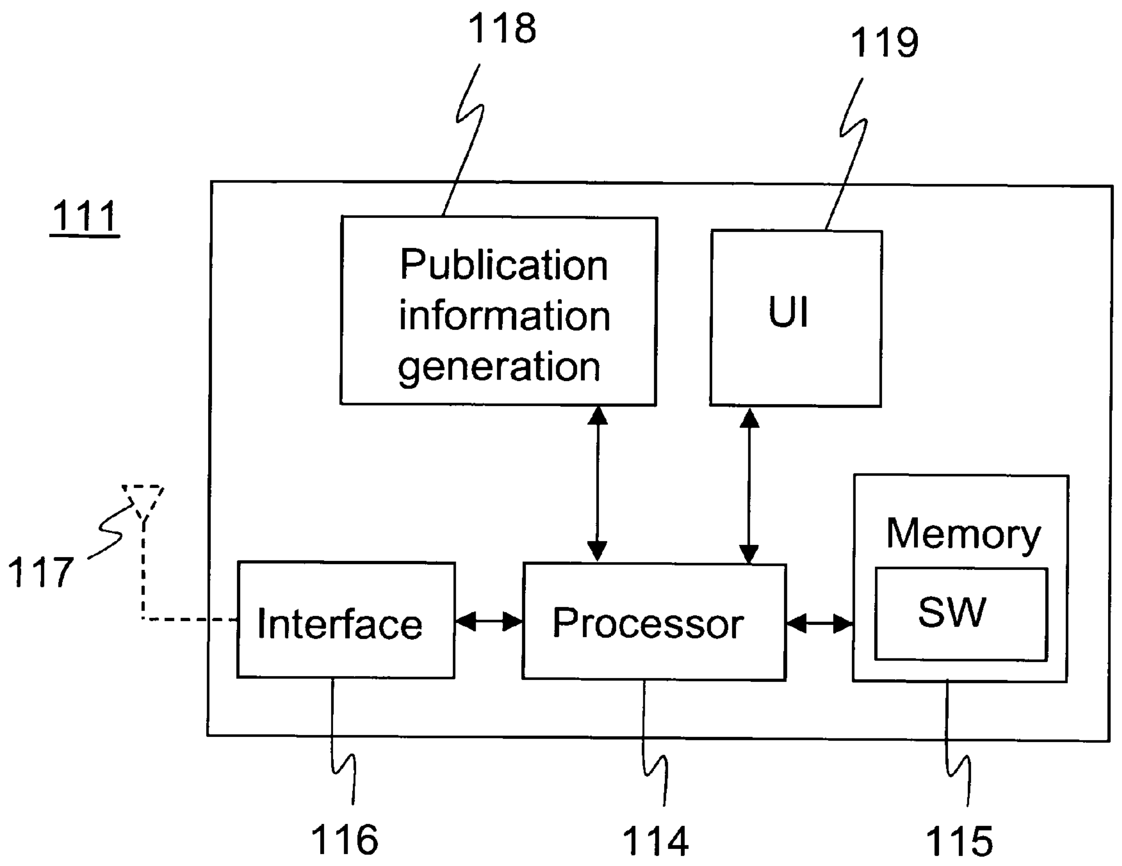
FIG. 5 shows a block diagram of an event state information supplier in accordance with an embodiment of the invention.

FIG. 5 shows a block diagram of an event state information supplier 111 in accordance with an embodiment of the invention. The supplier 111 may be a SIP compliant mobile or fixed terminal. It may be a mobile phone or portable handheld multimedia apparatus configured for wireless communication. The apparatus 111 comprises a processor 114 for controlling the operation of the apparatus 111, a memory 115 coupled to the processor 114 and computer program code or software, which is stored into memory 115. The software may include instructions for processor 114 to control the operation of the apparatus 111.

The apparatus 111 further comprises a communication interface 116 and a publication information generation function 118 coupled to the processor 114. The communication interface 116 comprises transmission and reception functions. These may be in the form of transmitters and receivers or transceivers with an RF antenna 117 if the device supports wireless cellular telecommunication. The antenna 117 has been drawn with dotted lines for illustrating the case where the apparatus 111 is a fixed terminal having no antenna and/or adapted merely for non-wireless communication.

The publication information generation function 118 generates publish requests comprising event state information to be sent to the event server 101 via the communication interface 116. For this purpose, a user of the apparatus may input event state information via a user interface 119. The information generation function 118 can add an URI attribute for each of the modular elements contained in the request to identify the different modules (as described in the preceding). The function 118 may be implemented by software.

Figure 6:
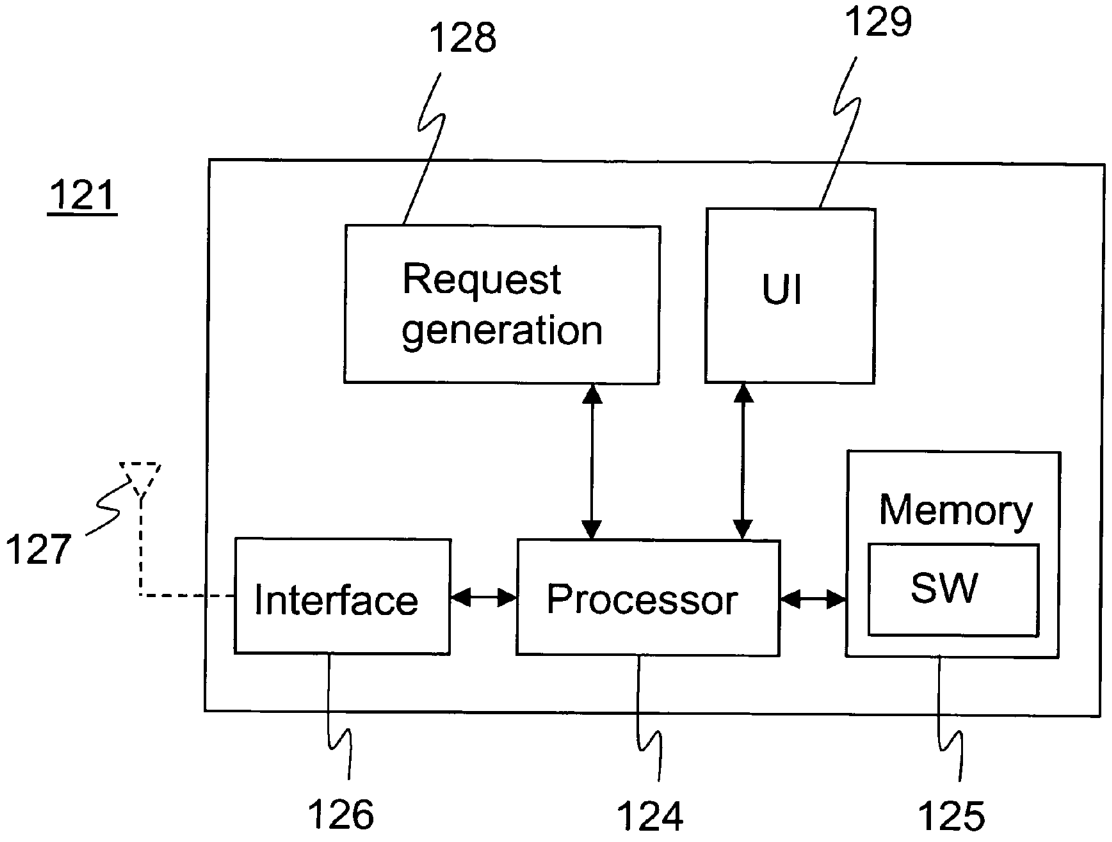
FIG. 6 shows a block diagram of an event state information watcher in accordance with an embodiment of the invention.

FIG. 6 shows a block diagram of an event state information watcher 121 in accordance with an embodiment of the invention. The watcher 121 may be a SIP compliant mobile terminal. It may be a mobile phone or portable handheld multimedia apparatus configured for wireless communication. Additional to the features described in the following, the apparatus 121 may also comprise the features described in the context of the preceding FIG. 5. The apparatus 121 comprises a processor 124 for controlling the operation of the apparatus 121, a memory 125 coupled to the processor 124 and computer program code or software, which is stored into memory 125. The software may include instructions for processor 124 to control the operation of the apparatus 121.

The apparatus 121 further comprises a communication interface 126 and a request generation function 128 coupled to the processor 124. The communication interface 126 comprises transmission and reception functions. These may be in the form of transmitters and receivers or transceivers with an RF antenna 127 if the device supports wireless cellular telecommunication. The antenna 127 has been drawn with dotted lines for illustrating also the case where the apparatus 121 is a fixed terminal having no antenna and/or adapted merely for non-wireless communication.

The request generation function 128 generates a subscribe request to be sent to the event server 101 via the communication interface 126. In order to communicate to the event server 101 the module or information of interest, the request generation function 128 can add an URI attribute and one or more filters to the subscribe request. The function 128 may be implemented by software.

The response received from the event server 101 and containing event state information is received via the communication interface 126. The received state information may be displayed to a user via a user interface 129. The user interface 129 may also be used for receiving input from the user, e.g., for defining the module or interest and filtering conditions (if any) for the subscribe request.

Figure 7:
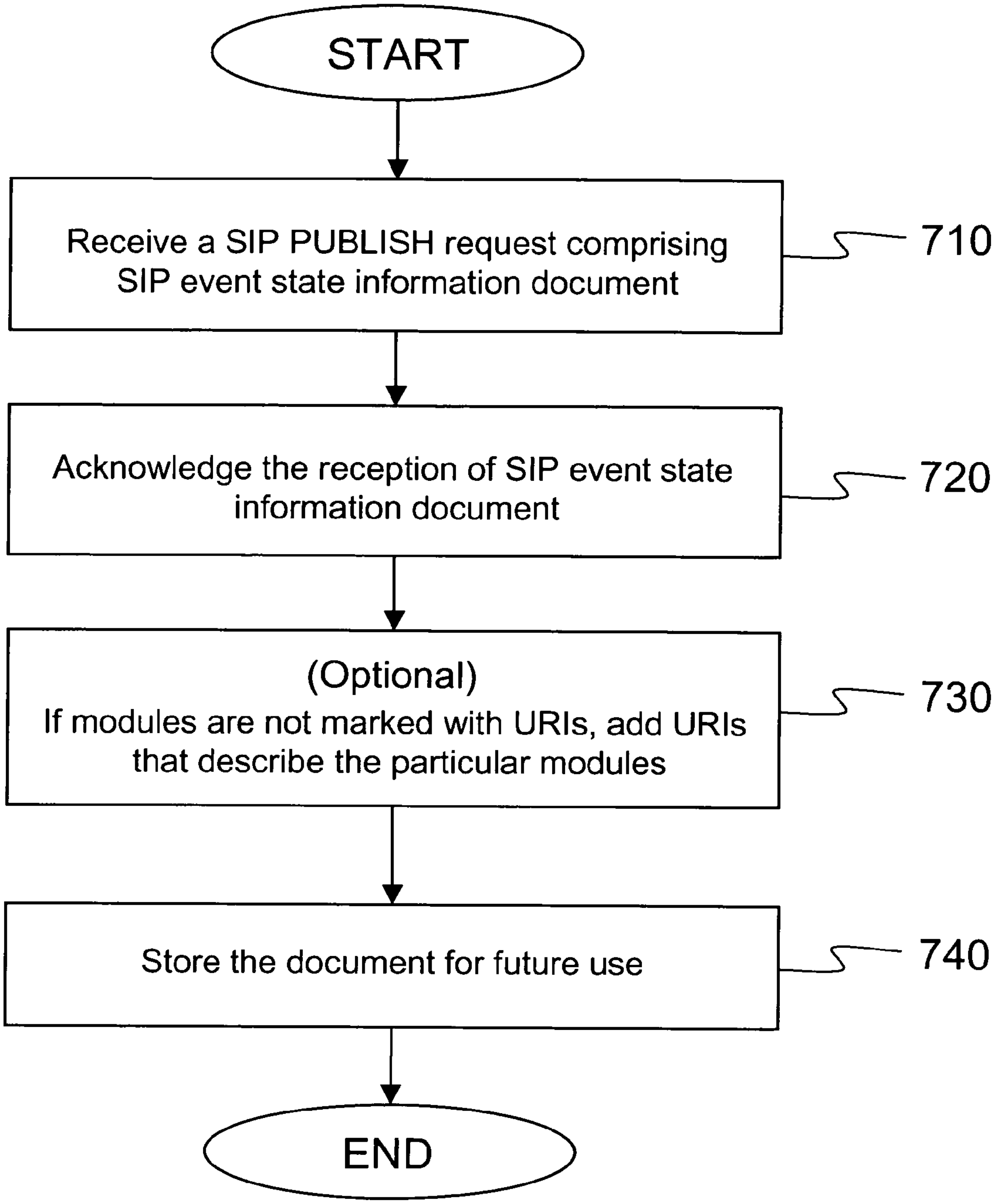
FIG. 7 shows a flow chart illustrating operation in an event server in accordance with an embodiment of the invention.

FIG. 7 shows a flow chart illustrating operation in an event server in accordance with an embodiment of the invention. In step 710, the event server receives a SIP PUBLISH request comprising SIP event state information document. In step 720, the event server transmits an acknowledgement to the information supplier which provided the received document. In an optional step 730, the event server adds URIs to modules to identify modules which have not been marked with URIs. In step 740, the received event state information document is stored for future use.

Figure 8:
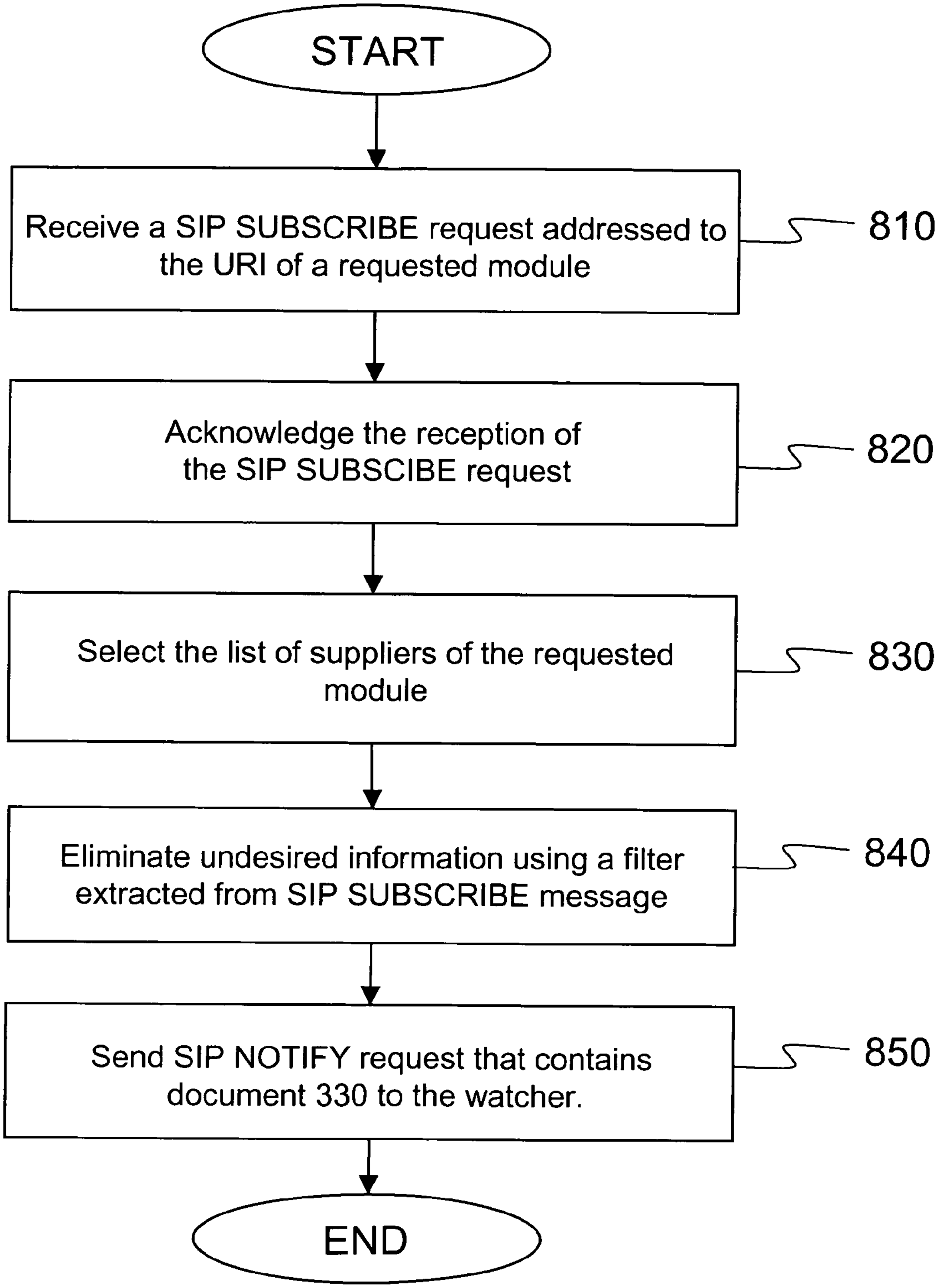
FIG. 8 shows a flow chart illustrating operation in an event server in accordance with another embodiment of the invention.

FIG. 8 shows a flow chart illustrating operation in an event server in accordance with another embodiment of the invention. In step 810, the event server receives a SIP SUBSCRIBE request addressed to the URI of a requested module. In step 820, the event server transmits an acknowledgement to the subscriber/watcher. In step 830, the event server selects the list of suppliers of the requested module. In step 840 the event server eliminates undesired information using a filter extracted from the SIP SUBSCRIBE message. In step 850, the event server sends a SIP NOTIFY request that contains document 330 (as described in the preceding) to the watcher.

Figure 9:
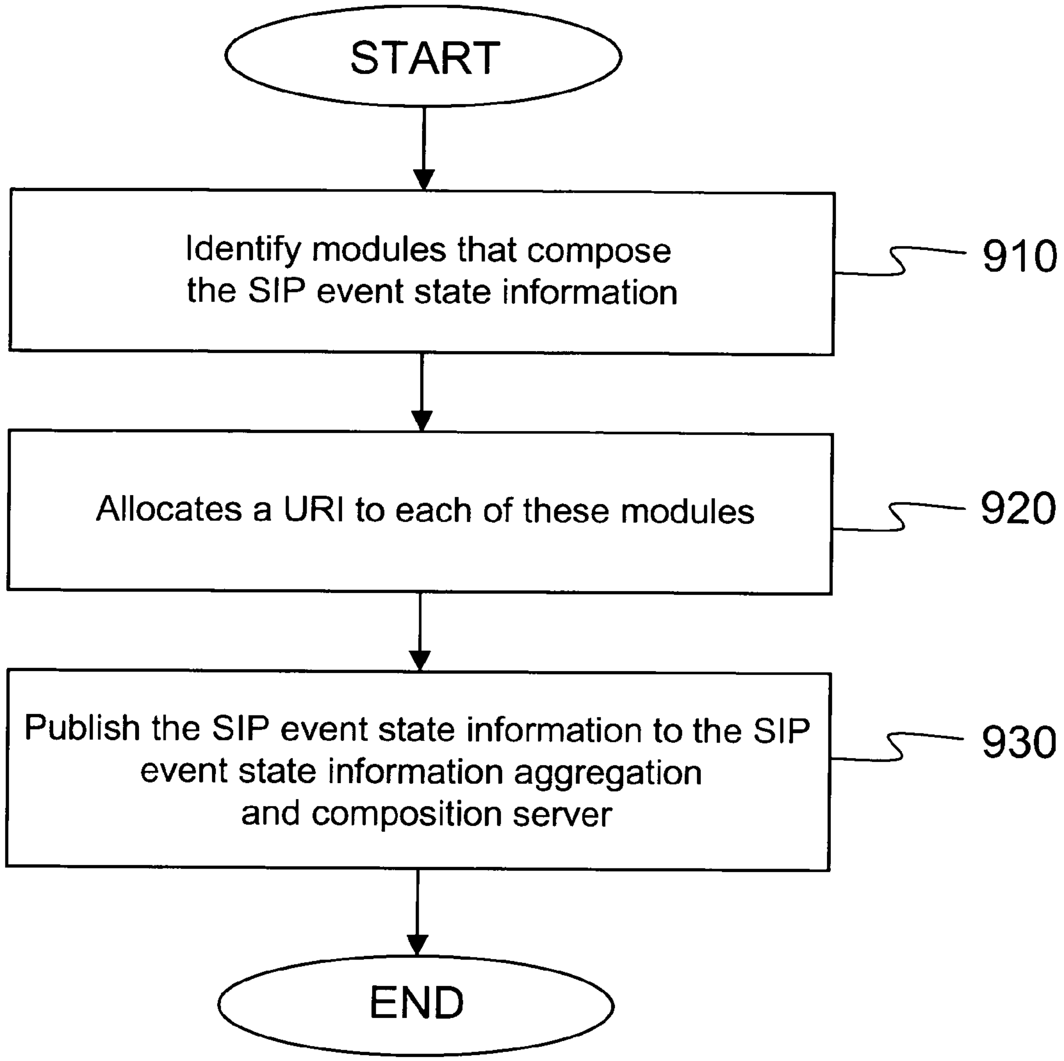
FIG. 9 shows a flow chart illustrating operation in an information supplier device in accordance with an embodiment of the invention.

FIG. 9 shows a flow chart illustrating operation in information supplier's device in accordance with an embodiment of the invention. In step 910, the supplier identifies those modules that compose the SIP event state information. In step 920, the supplier allocates a URI to each of these modules. In step 930, the supplier sends a SIP PUBLISH request to the event server in order to publish the SIP event state information.

Figure 10:
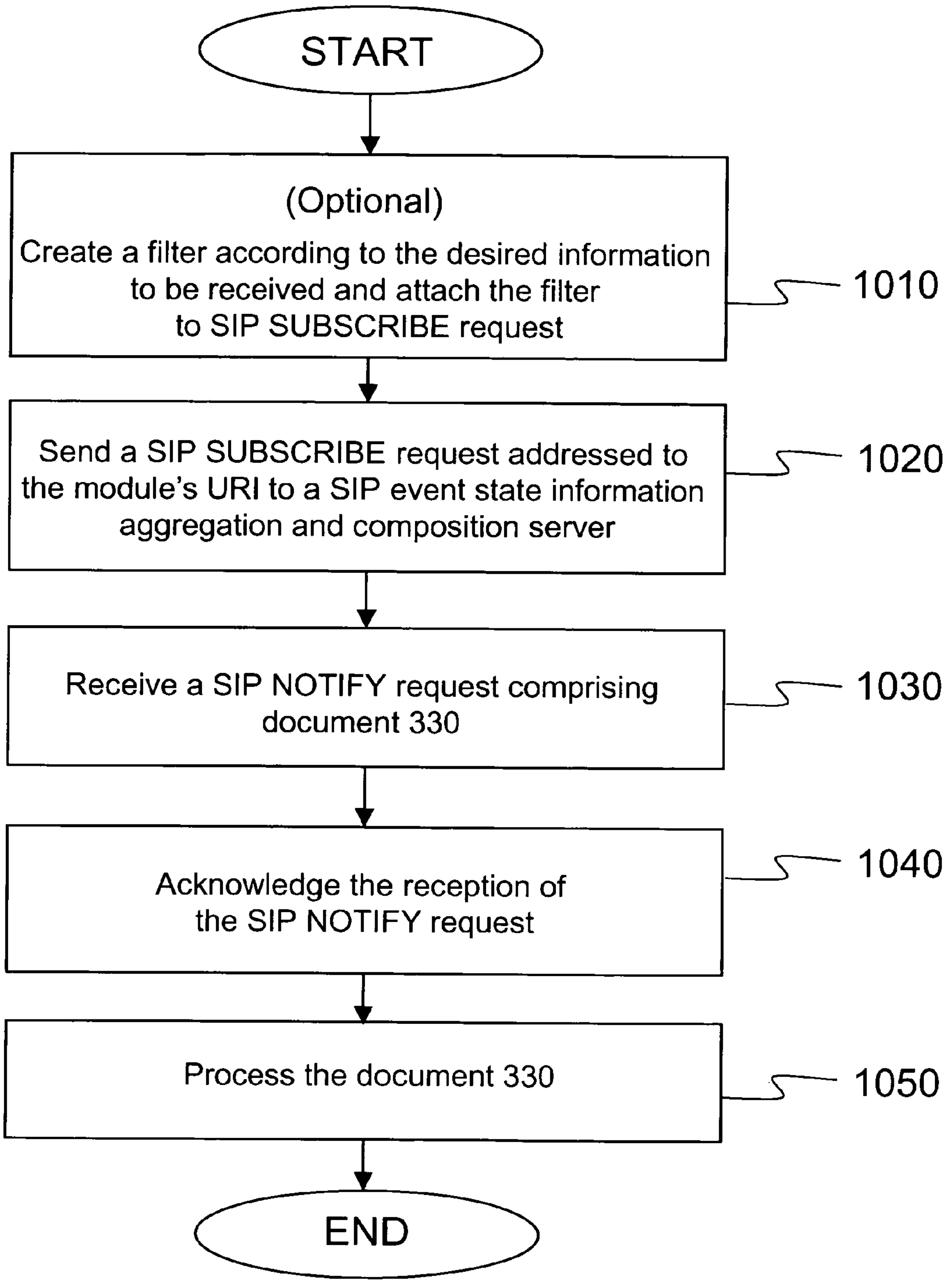
FIG. 10 shows a flow chart illustrating operation in an information watcher device in accordance with an embodiment of the invention.

FIG. 10 shows a flow chart illustrating operation in information watcher's device in accordance with an embodiment of the invention. In the optional step 1010, the watcher creates a filter that selects the desired information and attaches the filter to a SIP SUBSCRIBE request. In step 1020, the watcher sends to the event server a SIP SUBSCRIBE request addressed to the URI of the module of interest, together with the attached filter. In step 1030, the watcher in response receives a SIP NOTIFY request containing the document 330 (as described in the preceding). In step 1040, the watcher sends an acknowledgement of receipt of the SIP NOTIFY request to the event server. In step 1050, the watcher processes the document in an appropriate way.

Figure 11:
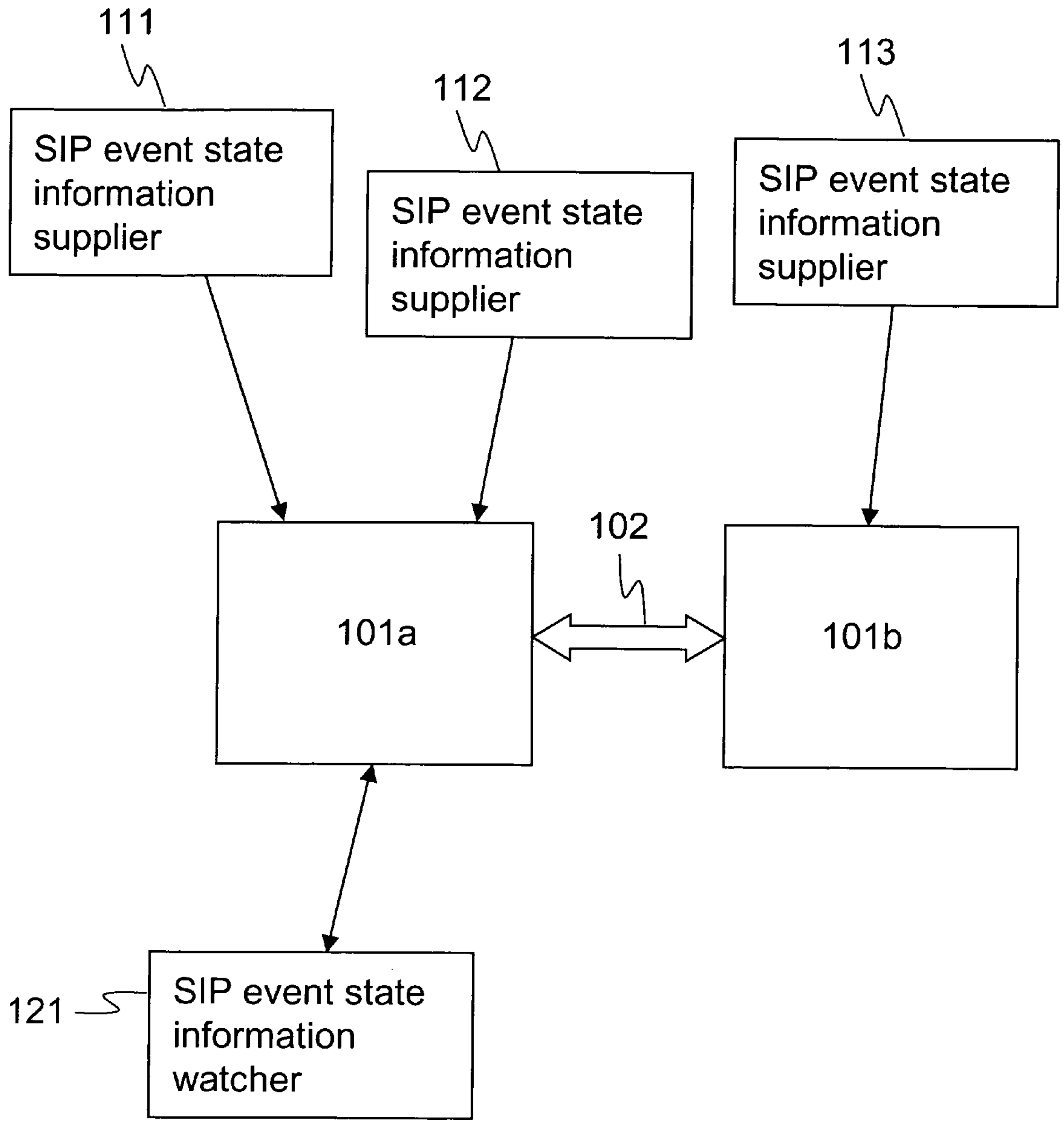
FIG. 11 shows a multi-server environment in accordance with an embodiment of the invention.

FIG. 11 shows a multi-server environment in accordance with an embodiment of the invention. The multi-server environment was already described in the preceding description. However, a slightly more detailed illustration is presented with the aid of FIG. 11. In the embodiment of FIG. 11, event servers 101*a* and 101*b* contain event state information provided by different information suppliers. Event server 101*a* contains event state information obtained from information suppliers 111 and 112, whereas event server 101*b* comprises contains event state information obtained from information supplier 113. Event servers 101*a* and 101*b* may be operated by different network or telecom operators. Event servers 101*a* and 101*b* are configured in a peer-to-peer configuration supported by a Distributed Hash Table (DHT), for example. By configuring servers 101*a* and 101*b* as peers in a DHT, the watcher 121 needs to discover one of the servers (here: event server 101*a*), where it will be sending its subscription. The DHT system will route the request also to peer 101*b* (arrow 102). In this way the watcher 121 will eventually get in response event state information stored in both event servers 101*a* and 101*b*.

Various embodiments of the invention have been presented. It should be appreciated that in this document, words comprise, include and contain are each used as open-ended expressions with no intended exclusivity.

The foregoing description has provided by way of non-limiting examples of particular implementations and embodiments of the invention a full and informative description of the best method and apparatus presently contemplated by the inventors for carrying out the invention. It is however clear to a person skilled in the art that the invention is not restricted to details of the embodiments presented above, but that it can be implemented in other embodiments using equivalent means without deviating from the characteristics of the invention.

Furthermore, some of the features of the above-disclosed embodiments of this invention could be used to advantage without the corresponding use of other features. As such, the foregoing description should be considered as merely illustrative of the principles of the present invention, and not in limitation thereof. Hence, the scope of the invention is only restricted by the appended patent claims.

The invention claimed is:

1. A method for managing event-based information, comprising:

receiving in an event server event-based information relating to a plurality of information suppliers; and linking same type of event-based information relating to different information suppliers together by a common uniform resource identifier, each different information supplier providing a different uniform resource identifier with different information, which is linked together with the common uniform resource identifier, wherein the common uniform resource identifier is an identifier of the type of event-based information;

wherein the type of event-based information comprises at least one of online/offline status, activity status, mood, type of location, time offset, planned activities and geographical location, wherein event state information relating to one information supplier is composed of modular elements each of the modular elements being identified by a different uniform resource identifier.

2. The method of claim 1, wherein the uniform resource identifier is a uniform resource name.

3. The method of claim 1, wherein the method comprises:

receiving in the event server from a watcher a subscription request comprising a uniform resource identifier addressed to a modular element event state information, collecting modular elements relating to different suppliers in accordance with the received uniform resource identifier identifying Said modular element; and transmitting collected event state information to the watcher.

4. The method of claim 3, wherein said collecting comprises collecting from a set of event servers, which have been formed as peers in a peer-to-peer configuration process which has been performed in advance.

5. The method of claim 3, further comprising that associated with the subscription request the event server receives a filter definition, the filter thus defined being applied to the collected event state information before sending it to the watcher.

6. A method for managing event-based information, comprising:

receiving in an event server event-based information relating to a plurality of information suppliers; and linking same type of event-based information relating to different information suppliers together by a common uniform resource identifier, each different information supplier providing a different uniform resource identifier with different information, which is linked together with the common uniform resource identifier, wherein the common uniform resource identifier is an identifier of the type of event-based information;

wherein the type of event-based information comprises at least one of online/offline status, activity status, mood, type of location, time offset, planned activities and geographical location, wherein event state information relating to different information suppliers is composed f modular elements, wherein similar modules of event state information relating to different information suppliers are identified by using a shared uniform resource identifier.

7. An apparatus, comprising:

a processor, memory including computer program code, the memory and the computer program code configured to, with the processor, cause the apparatus to:

receive event-based information relating to a plurality of information suppliers; and link same type of event information relating to different information suppliers together by a common uniform resource identifier; each different information, supplier providing a different uniform resource identifier with different information, which is linked together with the common uniform resource identifier, wherein the common uniform resource identifier is an identifier of type of event-based information;

wherein the type of event-based information comprises at least one of online/offline status, activity status, mood, type of location, time offset, planned activities and geographical location, wherein event state information relating to one information supplier is composed of modular elements each of the modular elements being identified by a different uniform resource identifier.

8. The apparatus of claim 7, wherein event state information is composed of modular elements and the apparatus is configured to provide a uniform resource identifier for those modular elements that miss one.

9. The apparatus of claim 7, wherein the apparatus is initiation protocol compliant.

10. The apparatus of claim 7, wherein the apparatus is configured to collect and send event state information to a watcher in accordance with a received uniform resource identifier identifying a modular element interest.

11. The apparatus of claim 10, wherein the apparatus is configured to filter the event state information to be sent to the watcher in accordance with a received filter.

12. The apparatus of claim 10, wherein the collecting comprises collecting from a set of event servers, which have been formed as peers in peer-to-peer configuration process which has been performed in advance.

13. An apparatus, comprising:

a processor, memory including computer program code, the memory and the computer program code configured to, with the processor, cause the apparatus to:

receive event-based information relating to a plurality of information suppliers; and link same type of event-based information relating to different information suppliers together by a common uniform resource identifier; each different information supplier providing a different uniform resource identifier with different information, which is linked together with the common uniform resource identifier, wherein the common uniform resource identifier is an identifier of the type of event-based information;

wherein the type of event-based information comprises at least one of online/offline status, activity status, mood, type of location, time offset, planned activities and geographical location, wherein event state information relating to different information suppliers is composed of modular elements, wherein similar modules of event state information relating to different information suppliers are identified by using a shared uniform resource identifier.

14. method for managing even-based information, comprising:

generating in a processor event-based information at an information supplier in modules so that different type of event-based information of the information supplier is represented by different modules;

identifying different modules of the information supplier by different uniform resource identifiers; and associating different modules of the information supplier with a uniform resource identifier of the information supplier;

wherein the type of event-based information comprises at least one of online/offline status, activity status, mood, type of location, time offset, planned activities and graphical location, and wherein the uniform resource identifier is an identifier of the type of event-based information, wherein event-based information relating to the information supplier is composed of modular elements each of the modular elements being identified by a different uniform resource identifier.

15. An apparatus, comprising:

a processor, memory including computer program code, the memory and the computer program code configured to, with the processor, cause the apparatus at least to:

generate event-based information at an information supplier in modules so that different type of event-based information of the information supplier is represented by different modules;

identify different modules of the information supplier by different uniform resource identifiers; and associate different modules of the information supplier with uniform resource identifier of the information supplier;

wherein the type event-based information comprises at least one online/offline status, activity status, mood, type of location, time offset, planned activities and geographical location, and wherein the uniform resource identifier is an identifier of the type of event-based information, wherein event-based information relating to the information supplier is composed of modular elements each of the modular elements being identified by a different uniform resource identifier.

16. The apparatus of claim 15, wherein the apparatus comprises a transmitter configured to publish the event-based information to an event server.

17. The apparatus of claim 15, wherein each module is identified by a uniform resource name.

18. The apparatus of claim 15, wherein the apparatus is configured for wireless communication and is session initiation protocol compliant.

19. A method for obtaining event-based information, comprising:

generating in a processor an event-based information subscription request addressed to a common uniform resource identifier which links together same type of event-based information relating to different information suppliers, wherein the common uniform resource identifier is an identifier of the type of event-based information; and transmitting, the subscription request to an event server, each different information supplier providing a different uniform resource identifier with different information, which is linked together with the common uniform resource identifier;

wherein the type of event-based information comprises at least one of online/offline status, activity status, mood, type of location, time offset, planned activities and geographical location, wherein event-based information relating to at least one of the information suppliers is composed of modular elements each of the modular elements being identified by a different uniform resource identifier.

20. The method of claim 19, wherein the method further comprises adding a filter to the subscription request in order to reduce the amount of event state information to be received in return.

21. An apparatus, comprising:

a processor, memory including computer program code, the memory and the computer program code configured to, with the processor, cause the apparatus to:

generate an event-based information subscription request addressed to a common uniform resource identifier which links together same type event-based information relating to different information suppliers, each different information supplier providing different uniform resource identifier with different information, which is linked together with the common uniform resource identifier, wherein the common uniform resource identifier is an identifier of the type of event-based information; and transmit the subscription request to an event server;

wherein the type of event-based information comprises at least one of online/offline status, activity status, mood, type of location, time offset, planned activities and geographical location, wherein event-based information relating to at least one of the information suppliers is composed of modular elements each of the modular elements being identified by a different uniform resource identifier.

22. The apparatus of claim 21, wherein the apparatus is configured for wireless communication and is session initiation protocol compliant.

23. The apparatus of claim 21, wherein the uniform resource identifier is a uniform resource name.

24. The apparatus of claim 21, wherein the apparatus is configured to add a filter to the subscription request in order to reduce the amount of event state information to be received in return.

* * * * *

UNITED STATES PATENT AND TRADEMARK OFFICE

CERTIFICATE OF CORRECTION

PATENT NO. : 8,458,309 B2
APPLICATION NO. : 11/607378
DATED : June 4, 2013
INVENTOR(S) : Miguel Angel Garcia-Martin and Marcin Matuszewski It is certified that error appears in the above-identified patent and that said Letters Patent is hereby corrected as shown below:

In the Claims

In Claim 3:
Column 17, line 62, "element event" should be -- element of event --.
Column 17, line 65, "Said" should be -- said --.
Column 17, line 66, "transmitting collected" should be -- transmitting the collected --.

In Claim 6:
Column 18, line 28, "composed f" should be -- composed of --.

In Claim 7:
Column 18, line 39, "event information" should be -- event based information --.
Column 18, line 41, "information," should be -- information --.
Column 18, line 45, "of type" should be -- of the type --.

In Claim 9:
Column 18, lines 59-60, "is initiation" should be -- is session initiation --.

In Claim 10:
Column 18, line 64, "element interest" should be -- element of interest --.

In Claim 12:
Column 19, line 3, "in peer-to-peer" should be -- in a peer-to-peer --.

In Claim 14:
Column 19, line 44, "graphical" should be -- geographical --.

In Claim 15:
Column 19, line 63, "with uniform" should be -- with a uniform --.
Column 19, line 65, "type event-based" should be -- type of event-based --.
Column 19, line 66, "one online/offline" should be -- one of online/offline --.

In Claim 21:
Column 20, line 49, "type event-based" should be -- type of event-based --.
Column 20, line 51, "providing different" should be -- providing a different --.

Signed and Sealed this
Sixth Day of August, 2013

Teresa Stanek Rea
*Acting Director of the United States Patent and Trademark Office*